Patented May 16, 1933

1,909,385

UNITED STATES PATENT OFFICE

ALEXANDER J. WUERTZ, OF WILMINGTON, DELAWARE, ASSIGNOR TO E. I. DU PONT DE NEMOURS & COMPANY, OF WILMINGTON, DELAWARE, A CORPORATION OF DELAWARE

DYESTUFF AND PROCESS FOR PREPARING SAME

No Drawing.    Application filed December 23, 1929.   Serial No. 416,213.

This invention relates to the synthesis of novel dyestuffs, and specifically to the synthesis of dyestuffs formed from derivatives of benzanthrone containing nuclear nitrogen.

In German Patents Nos. 407,838, 407,689 and 411,013 it is pointed out that benzanthrone under certain conditions of condensation undergoes a chemical reaction which results in the formation of 2:2'-dibenzanthronyl, to which the following formula has been assigned:

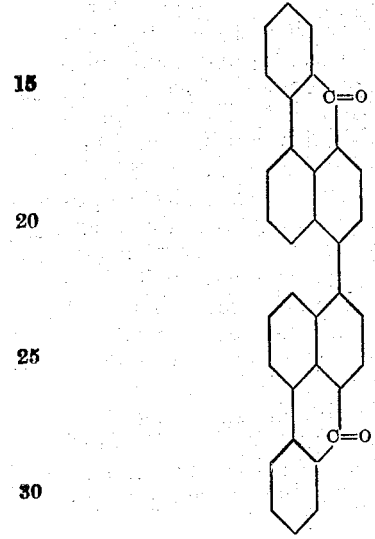

It is further pointed out that 2:2'-dibenzanthronyl, by subsequent fusion with potash, gives violanthrone, as follows:

What is generally regarded as the unsymmetrical form of dibenzanthrone is the isometric form, isoviolanthrone (2-Bz-1:2'-Bz-1'-dibenzanthrone), formed either from Bz-1-chlorobenzanthrone or from the corresponding sulphur derivative resulting in 2-Bz-1'-dibenzanthronyl-sulphide. The reactions take place as follows:

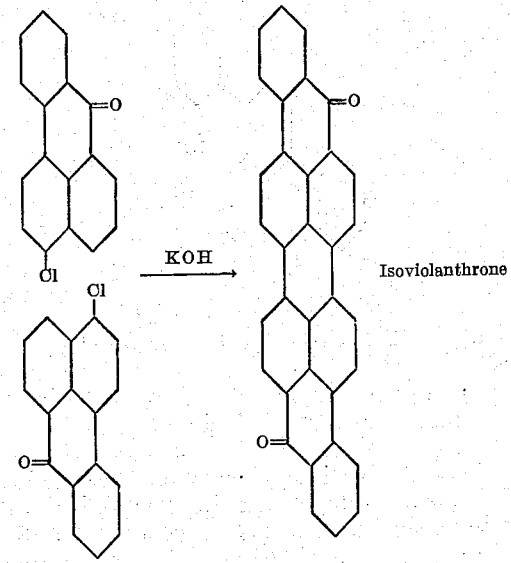

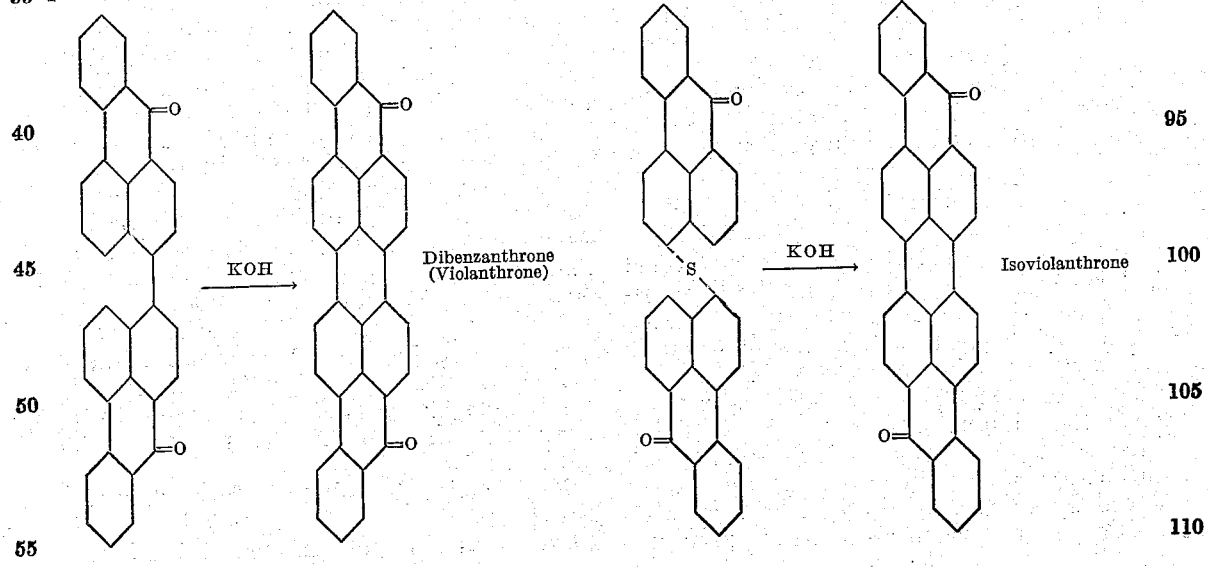

The reactions referred to above are not smooth and uniform since a number of by-products are formed which have more or less an indefinite constitution and which serve not only to render the process of producing the desired compounds less efficient, but also to produce dyes which are not as uniform as is desired.

In a copending application I have described the synthesis of a new series of benzanthrone derivatives which are heterocyclic ring systems containing nuclear nitrogen. These new compounds I have shown to be formed by fusing benzanthrone with a primary base such, for example, as aniline, in the presence of caustic alkali and nitrobenzene. The products formed by such synthesis are benzanthrone acridines. As an example of such acridines, the compound formed when aniline is used has the probable formula:

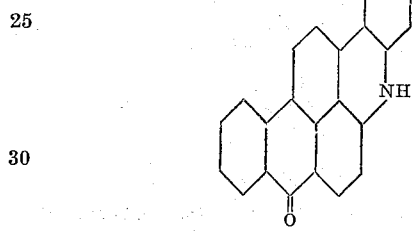

which is 2-Bz-1-benzanthrone-hydro-acridine.

My invention has for one of its objects the transformation of derivatives, such as the acridines referred to above, to dibenzanthrone derivatives of novel characteristics and unusual purity. A further object of my invention is the use of such novel dibenzanthrone derivatives as dyestuffs. Other objects will appear as this description proceeds.

These objects are accomplished by a procedure which briefly consists in treating benzanthrone derivatives containing nuclear nitrogen with an alcoholic alkaline solution and with a metallic alkali metal. An example of my novel procedure follows:

*Example 1*

200 parts of caustic potash are suspended in 200 parts of ethyl alcohol. To this suspension are added 25 parts of metallic sodium and the temperature of the whole is raised to approximately 100 to 110° C. The suspension is maintained at this temperature until the sodium has been completely disintegrated. 125 parts of 2-Bz-1-benzanthrone-hydro-acridine (the product produced by the fusion of benzanthrone with aniline in the presence of nitrobenzene and caustic potash and having the probable formula

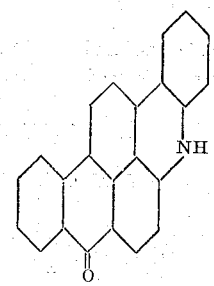

are then introduced into the melt and the temperature is raised to approximately 150–165° C. and maintained at this point for about two to four hours or until no further reaction is perceptible. The melt is then poured into 4,000 parts of water and boiled until the dyestuff is completely precipitated. It separates from the mother liquor in long, thin, curved needles which are insoluble in alkaline solutions. In sulphuric acid solution a pure dark blue color is formed. In sulphuric acid solution the prior art violanthrone forms a red-violet solution and the prior art isoviolanthrone forms a bluish-green solution. When employed as a dyestuff the product formed by the above examples dyes approximately the same shade as violanthrone. However, when it is chlorinated it dyes in slightly redder shades of powerful strength and excellent brightness and fastness. Contrary to expectations, it oxidizes to an oxy-derivative when treated with manganese dioxide in sulphuric acid solution, and the product dyes with pure green shades. It crystallizes from sulphuric acid and is insoluble in nearly all of the ordinary organic solvents.

It will be understood that the procedure given in the example above was set forth in detail merely for the purposes of illustration. Numerous modifications may be made at various points in the above process without departing from the limits contemplated by my invention. For example, methyl alcohol may be substituted for ethyl alcohol as a suspension medium, and the amounts of reagents may be varied within reasonable limits without modifying the procedure. I do not wish to be limited to the specific benzanthrone acridine mentioned in the above example. Any derivative of benzanthrone which contains nuclear nitrogen may be employed. Thus, 2-Bz-1-benzanthrone-para-methyl-hydro-acridine, 2-Bz-1-benzanthrone-ortho-methyl-hydro-acridine and homologous derivatives containing substituents other than the methyl group may be employed.

The reaction by which I form this new dyestuff produced by the process illustrated above cannot be determined beyond any doubt, but based upon the available knowledge of the formation of violanthrone and iso-violanthrone it seems probable that the course of the reaction progresses as follows:

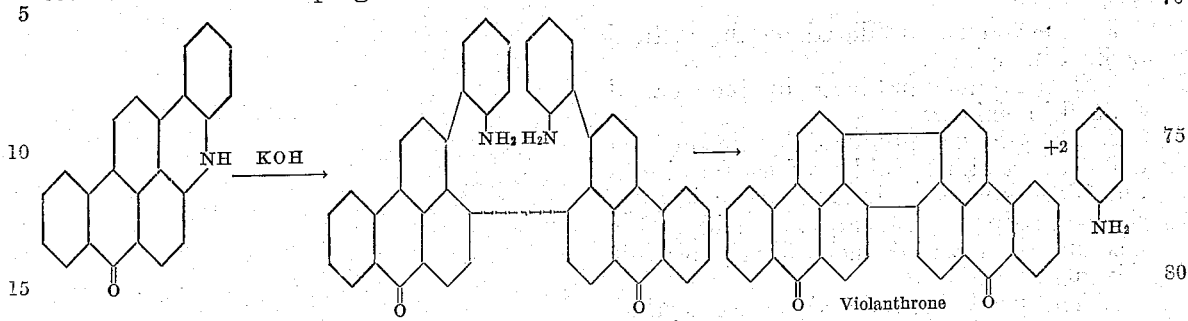

Possibly the reaction assumes an assymetrical course in the second phase to produce dibenzanthrone-difluoranthere. If such a course is followed the reaction would be

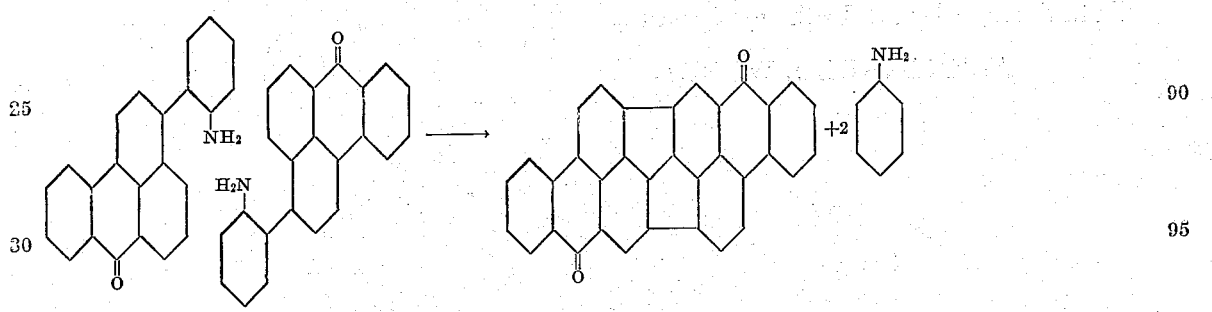

Theoretically, and quite possibly, the reaction could proceed with the formation of iso-violanthrone according to the following mechanism:

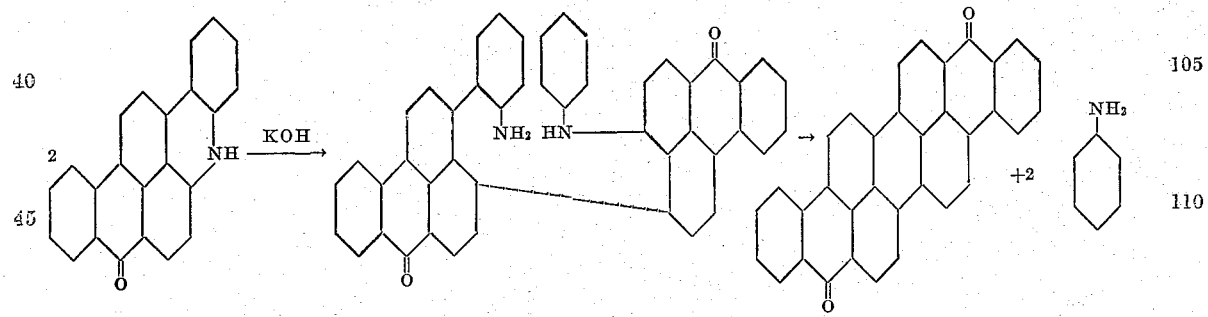

It cannot be stated with unqualified assurance just which of the three above formulæ represents, if indeed any one of them represents, the dye produced by my process. It is possible that my new dye is any one of the compounds or a mixture of several of the compounds graphically represented above—it may even have a formula different from those set forth. Nevertheless, although it analyzes with respect to carbon, hydrogen and oxygen content the same as violanthrone or iso-violanthrone, it exhibits sufficient differences in its properties and the characteristics of its dyeings to make certain that it is not the same as the violanthrone or iso-violanthrone heretofore produced or described in the prior art.

Since many embodiments of this invention, differing widely in one or more respects, may be made without departing from the spirit of my invention, it is to be understood that I do not limit myself to the foregoing examples or description except as indicated in the following claims.

I claim:

1. The process of preparing new dyestuffs which comprises heating a benzanthrone-acridine in the presence of an alcoholic-caustic potash mixture in which metallic sodium has been dissolved.

2. The process of preparing new dyestuffs which comprises heating 2-Bz-1-bezanthrone-hydro-acridine in the presence of an alcoholic-caustic potash mixture in which metallic sodium has been dissolved.

3. The process of preparing new dyestuffs which comprises heating 2-Bz-1-benzanthrone-hydro-acridine at about 150 to 165° C. in the presence of an ethyl alcohol-caustic potash mixture to which metallic sodium has previously been added.

4. The process of preparing new dyestuffs which comprises forming an intermediate by heating a mixture of benzanthrone, aniline, caustic potash and nitrobenzene and thereafter heating said intermediate in the presence of an ethyl alcohol-caustic potash mixture to which metallic sodium has previously been added.

5. The product produced by the method defined in claim 1.

6. The product produced by the method defined in claim 2.

7. The product produced by the method defined in claim 3, said product forming a pure dark blue color in sulphuric acid solution, crystallizes from sulphuric acid, and is insoluble in most of the ordinary organic solvents.

8. The product produced by the method defined in claim 4, said product forming a pure dark blue color in sulphuric acid solution, crystallizes from sulphuric acid, and is insoluble in most of the ordinary organic solvents.

In testimony whereof, I affix my signature.

ALEXANDER J. WUERTZ.